United States Patent
Yang et al.

(10) Patent No.: US 8,841,038 B2
(45) Date of Patent: Sep. 23, 2014

(54) FUEL CELL SYSTEM HAVING UNREACTED GAS DISCHARGE PIPELINE

(75) Inventors: Jefferson Y S Yang, Orange, CA (US);
Feng-Hsiang Hsiao, Taipei (TW)

(73) Assignee: Asia Pacific Fuel Cell Technologies, Ltd., Miaoli (TW)

(*) Notice: Subject to any disclaimer, the term of this patent is extended or adjusted under 35 U.S.C. 154(b) by 1943 days.

(21) Appl. No.: 11/797,514

(22) Filed: May 4, 2007

(65) Prior Publication Data

US 2007/0259233 A1    Nov. 8, 2007

(30) Foreign Application Priority Data

May 5, 2006 (TW) ................................. 95116150 A

(51) Int. Cl.
*H01M 8/04* (2006.01)
*H01M 8/10* (2006.01)
*H01M 8/06* (2006.01)

(52) U.S. Cl.
CPC ...... *H01M 8/04141* (2013.01); *H01M 8/04201* (2013.01); *H01M 2008/1095* (2013.01); *H01M 8/04029* (2013.01); *H01M 8/065* (2013.01); Y02E 60/50 (2013.01)
USPC ........... 429/414; 429/413; 429/415; 429/437; 429/462

(58) Field of Classification Search
CPC .............. H01M 8/04; H01M 8/04007; H01M 8/04067; H01M 8/04119; H01M 8/04126; H01M 8/04141; H01M 8/044492–8/04522
USPC .................................................. 429/413, 414
See application file for complete search history.

(56) References Cited

U.S. PATENT DOCUMENTS

| | | | |
|---|---|---|---|
| 6,805,988 B2 * | 10/2004 | Shimanuki et al. | 429/414 |
| 6,953,635 B2 * | 10/2005 | Suzuki et al. | 429/414 |
| 2005/0173170 A1 * | 8/2005 | Miyajima et al. | 180/68.5 |

FOREIGN PATENT DOCUMENTS

| | | | |
|---|---|---|---|
| DE | 102004034071 | 2/2006 | |
| EP | 1469546 | 10/2004 | |
| EP | 1469548 A2 * | 10/2004 | H01M 8/10 |
| FR | 2837025 | 9/2003 | |
| JP | 09-055218 A * | 2/1997 | H01M 8/10 |
| JP | 2006210021 A * | 8/2006 | H01M 8/04 |
| WO | WO2005/062411 | 7/2005 | |

OTHER PUBLICATIONS

Machine translation of Furuya, JP 09-055218 A.*
Machine translation for Yokoi, P 2006-210021 A.*
Communication from the European Patent Office with Search Report in regard to the foreign corresponding application EP07009846, Sep. 20, 2007.
Communication from the European Patent Office with Search Report in regard to the foreign corresponding application EP07009846, Dec. 19, 2007.

* cited by examiner

*Primary Examiner* — Edu E Enin-Okut
(74) *Attorney, Agent, or Firm* — Rosenberg, Klein & Lee

(57) ABSTRACT

A fuel cell system includes a fuel cell stack and a humidifier. The humidifier includes an unreacted gas inlet port connected to an end of an unreacted hydrogen discharge pipeline, which is connected at the other end to a hydrogen outlet port of the fuel cell stack, such that the unreacted hydrogen discharged from the fuel cell stack via the hydrogen outlet port is led by the unreacted hydrogen discharge pipeline into the humidifier. The humidifier regulates the humidity and concentration of the unreacted hydrogen led thereinto, and the unreacted hydrogen is then discharged from the humidifier.

10 Claims, 3 Drawing Sheets

FUEL CELL SYSTEM HAVING UNREACTED GAS DISCHARGE PIPELINE

FIELD OF THE INVENTION

The present invention relates to a technique for treating unreacted gas discharged from a fuel cell stack, and more particularly to a fuel cell system having unreacted gas discharge pipeline associated with a humidifier.

BACKGROUND OF THE INVENTION

A fuel cell is a power-generating unit that generates electrical energy through electrochemical reaction of hydrogen-containing fuel and air. Since the fuel cell has the advantages of low pollution, high efficiency, and high energy density, it has been positively researched, developed, and promoted in many countries. Among others, the proton exchange membrane fuel cell (PEMFC) is the most industrially valuable product due to its low operating temperature, quick activation, and high energy density.

In the fuel cell, hydrogen ions move from the anode to the cathode to complete the electrochemical reaction. The performance of a fuel cell has close relation to different operating conditions, such as temperature, humidity, hydrogen flow, air flow, etc. Regarding the humidity, it is necessary to keep a high molecular proton exchange membrane in the fuel cell at proper operating humidity for the fuel cell to achieve high performance. Meanwhile, the fuel cell must also be maintained at a proper operating temperature.

To maintain the fuel cell at proper operating humidity and temperature, one of the currently adopted ways is to provide the reactant gas supply pipelines of the fuel cell with a humidifier associated with a cooling water system. With this arrangement, cooling water is supplied from the cooling water system to cool the fuel cell and then discharged from the fuel cell. The discharged cooling water has a high temperature about 60 to 70°C., and is led to the humidifier to increase the humidity and temperature of the reactant gas passed through the humidifier before the reactant gas is supplied to the fuel cell. For example, fresh air or oxygen is sent by an air blower to the humidifier before being led to the fuel cell via an oxygen inlet port thereof, so that the air flown into the fuel cell has a proper humidity.

While the technique of providing a humidifier to regulate the humidity of the reactant gas for the fuel cell has become matured, there is not any technical teaching or suggestion on using a humidifier to treat the unreacted gas discharged from the fuel cell.

Another important issue about the fuel cell is the unreacted hydrogen discharged from the fuel cell. Unlike the unreacted oxygen that can be directly discharged into ambient air, the unreacted hydrogen is highly dangerous and subject to self-combustion and explosion when a local concentration of the discharged unreacted hydrogen exceeds 4%. Therefore proper measures must be taken to treat the unreacted hydrogen discharged from the fuel cell. In a currently adopted way, the unreacted hydrogen is led back to the fuel cell and recycled. However, the recycled hydrogen as reactant gas has reduced purity to possibly cause the poisoning problem. One way to solve the above purity and poisoning problems is to recycle only part of the discharged unreacted hydrogen. The remaining part of the discharged unreacted hydrogen is led to a catalytic converter and treated before being discharged into ambient air. However, the catalytic converter requires additional and quite high cost.

SUMMARY OF THE INVENTION

A primary object of the present invention is to provide a fuel cell system having unreacted gas discharge pipeline associated with humidifier to modify the concentration of discharged hydrogen. So unreacted hydrogen is discharged from a fuel cell stack and its humidity is regulated at the humidifier. Thus, the unreacted hydrogen can be safely discharged into ambient air without causing potential danger.

Another object of the present invention is to provide a fuel cell system having an unreacted hydrogen discharge pipeline that replaces the catalytic converter used in conventional fuel cell stack for treating unreacted gas, so that the cost for treating the unreacted gas discharged from the fuel cell stack can be reduced.

To fulfill the above objects, the present invention provides a fuel cell system having unreacted gas discharge pipeline associated with humidifier. The fuel cell system comprises a fuel cell stack and a humidifier. The humidifier includes an unreacted gas inlet port connected to an end of an unreacted hydrogen discharge pipeline, which is connected at the other end to a hydrogen outlet port of the fuel cell stack, such that the unreacted hydrogen discharged from the fuel cell stack via the hydrogen outlet port is led by the unreacted hydrogen discharge pipeline into the humidifier. The humidifier regulates humidity and concentration of the unreacted hydrogen led thereinto, and the unreacted hydrogen is then discharged from the humidifier.

With the arrangements of the present invention, reactant gas is regulated at the humidifier to increase the humidity and temperature thereof before being supplied to the fuel cell stack, so that the fuel cell stack can be maintained at proper operating humidity and temperature. Moreover, a part of the unreacted hydrogen may be led back to the fuel cell stack and recycled while the other part of the unreacted hydrogen is led to the humidifier where the humidity of the unreacted hydrogen is regulated and the concentration of the unreacted hydrogen is diluted for safely discharging into ambient air. Therefore, the present invention enables reduced cost for treating unreacted gas discharged from the fuel cell stack.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
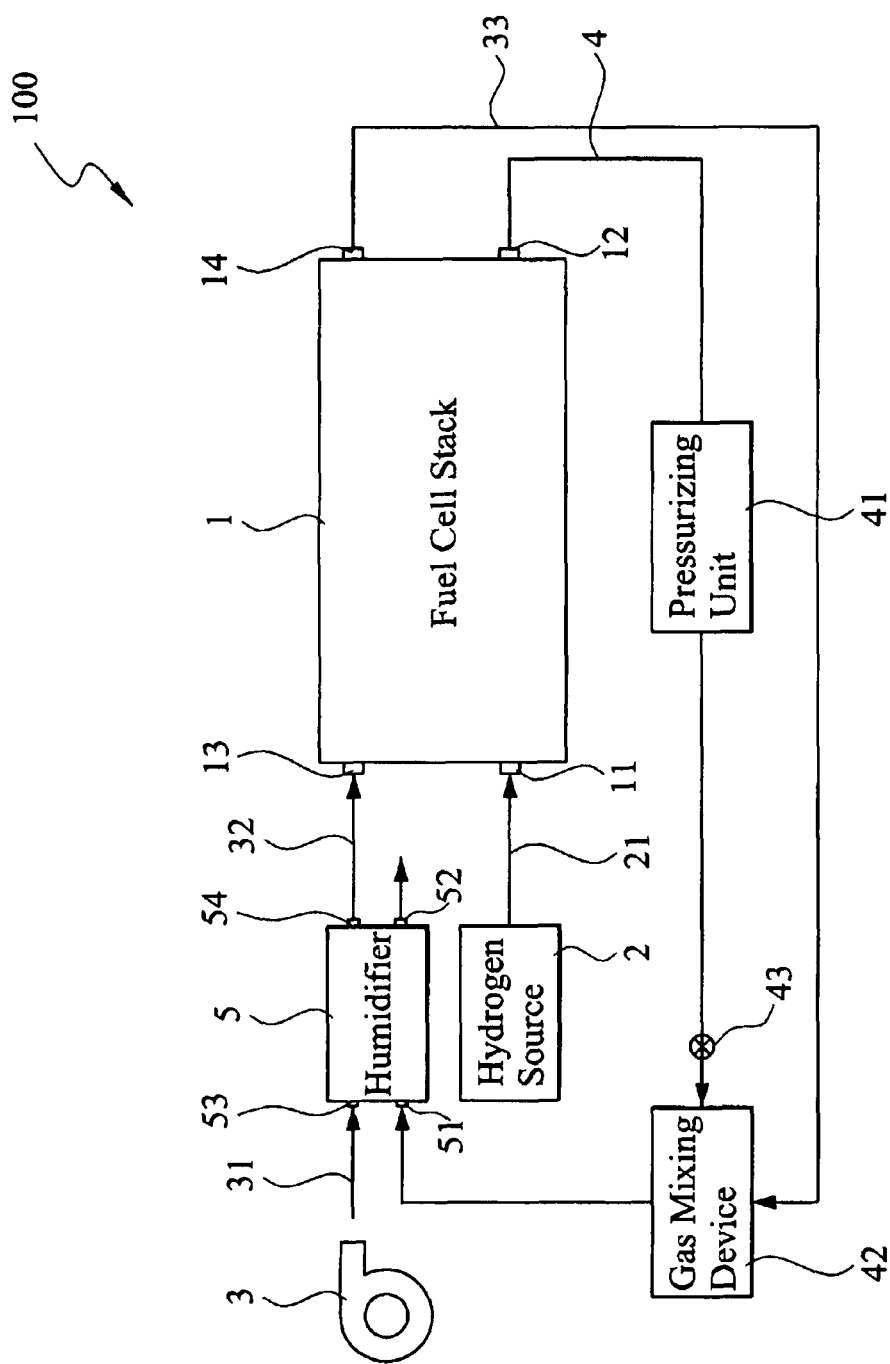
FIG. 1 is a block diagram of a fuel cell system having unreacted gas discharge pipeline associated with humidifier according to a first embodiment of the present invention.

Please refer to FIG. 1 that is a block diagram of a fuel cell system 100 having unreacted gas discharge pipeline associated with humidifier according to a first embodiment of the present invention. As shown, the fuel cell system 100 includes a fuel cell stack 1, a hydrogen source 2, an oxygen source 3, an unreacted hydrogen discharge pipeline 4, and a humidifier 5.

The fuel cell stack 1 includes a hydrogen inlet port 11. A hydrogen supplying pipeline 21 is extended between and connected to the hydrogen source 2 and the hydrogen inlet port 11, so that hydrogen supplied from the hydrogen source 2 is led into the fuel cell stack 1 via the hydrogen supplying pipeline 21 and the hydrogen inlet port 11. The fuel cell stack 1 further includes a hydrogen outlet port 12, via which unreacted hydrogen in discharged from the fuel cell stack 1; an oxygen inlet port 13, via which oxygen is fed into the fuel cell stack 1; and an oxygen outlet port 14, via which unreacted oxygen is discharged from the fuel cell stack 1.

The unreacted hydrogen discharge pipeline 4 is connected at an end to the hydrogen outlet port 12 for leading the unreacted hydrogen discharged from the fuel cell stack 1 to the humidifier 5. A pressurizing unit 41, a gas mixing device 42, and an unreacted hydrogen discharge control unit 43 are connected to the unreacted hydrogen discharge pipeline 4. The pressurizing unit 41 applies appropriate pressure to the unreacted hydrogen to thereby increase a flow rate of the unreacted hydrogen. The unreacted hydrogen and unreacted oxygen discharged from the fuel cell stack 1 are led to the gas mixing device 42 to mix with each other therein. The unreacted hydrogen discharge control unit 43 controls the volume of unreacted hydrogen to be led into the gas mixing device 42.

The humidifier 5 includes an unreacted gas inlet port 51, to which the other end of the unreacted hydrogen discharge pipeline 4 is connected, so that the unreacted hydrogen discharged from the fuel cell stack 1 is finally led to the humidifier 5; an unreacted gas outlet port 52; an oxygen source inlet port 53 connected to the oxygen source 3 via an oxygen supply pipe 31, so that oxygen supplied from the oxygen source 3 is led by the oxygen supply pipe 31 into the humidifier 5 via the oxygen source inlet port 53 for humidity regulation; and a humidified oxygen outlet port 54 connected to the oxygen inlet port 13 of the fuel cell stack 1 via an oxygen supplying pipeline 32, so that oxygen having been humidified in the humidifier 5 is fed into the fuel cell stack 1 via the oxygen supplying pipeline 32 and the oxygen inlet port 13.

The fuel cell system 100 further includes an unreacted oxygen discharge pipeline 33 extended between and connected to the oxygen outlet port 14 of the fuel cell stack 1 and the gas mixing device 42 on the unreacted hydrogen discharge pipeline 4, so that unreacted oxygen discharged via the oxygen outlet port 14 is mixed with the discharged unreacted hydrogen in the gas mixing device 42. The oxygen/hydrogen gas mixture is then led into the humidifier 5 via the unreacted gas inlet port 51.

The oxygen supplied from the oxygen source 3 is relatively dry. The relatively dry oxygen from the oxygen source 3 is led into the humidifier 5 via the oxygen supply pipe 31 and regulated to become relatively humid. The relatively humid oxygen is then led from the humidifier 5 to the fuel cell stack 1 via the oxygen supplying pipeline 32.

The humidifier 5 also regulates the humidity of the unreacted oxygen/hydrogen gas mixture led thereto from the gas mixing device 42. The unreacted oxygen/hydrogen gas mixture is then discharged via the unreacted gas outlet port 52.

By mixing the unreacted hydrogen with the unreacted oxygen in the gas mixing device 42, the potentially dangerous unreacted hydrogen may have a reduced concentration. And by humidifier 5, the concentration of the unreacted hydrogen is further reduced, in some practical applications of the present invention it is even to be reduced to less than 1%. The humidity of the unreacted hydrogen is also regulated to reduce the potential danger of hydrogen, allowing the unreacted hydrogen to be safely discharged into ambient air.

Figure 2:
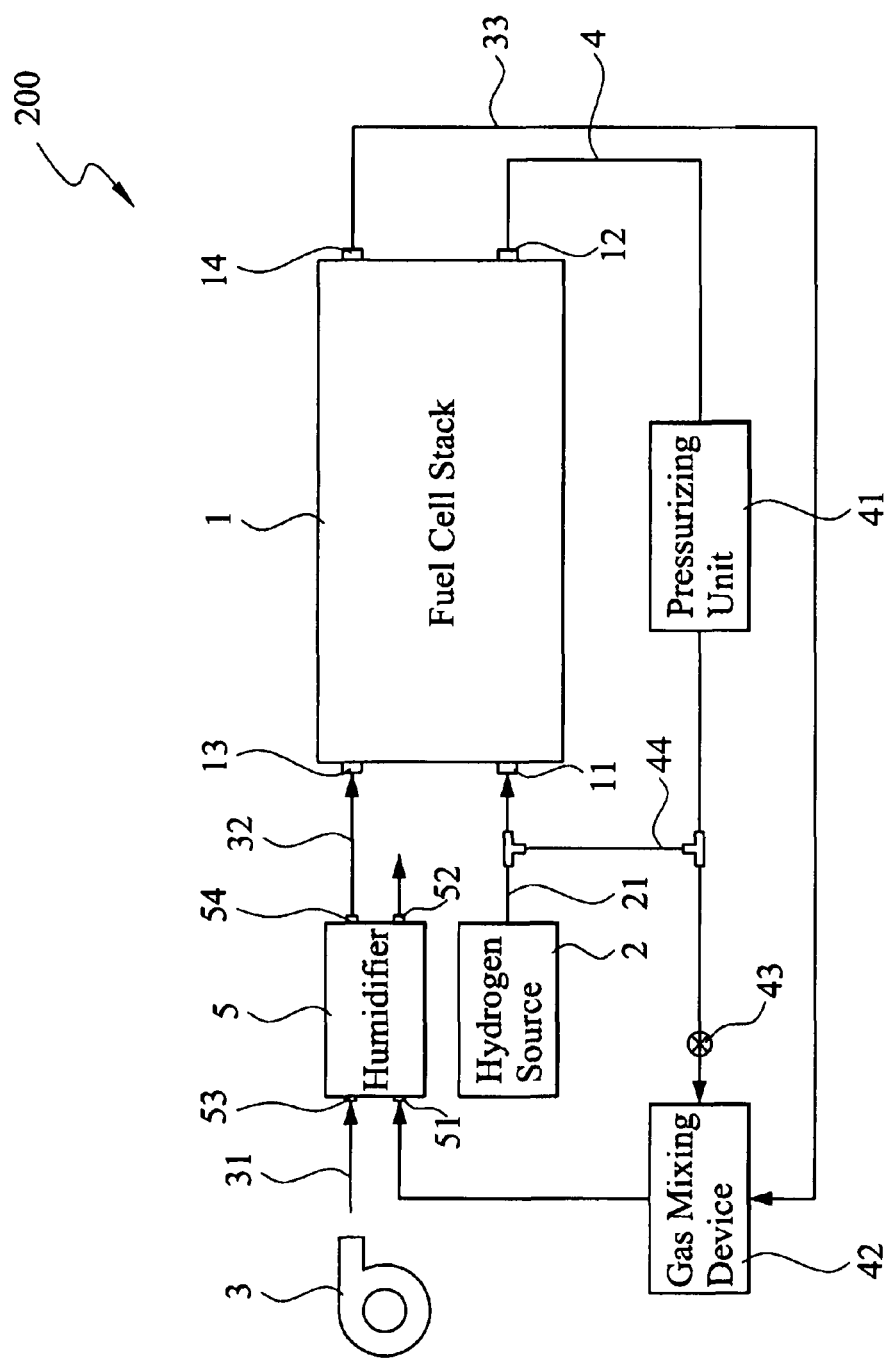
FIG. 2 is a block diagram of a fuel cell system having unreacted gas discharge pipeline associated with humidifier according to a second embodiment of the present invention.

FIG. 2 is a block diagram of a fuel cell system 200 having unreacted gas discharge pipeline associated with humidifier according to a second embodiment of the present invention. As can be seen from FIG. 2, the fuel cell system 200 in the second embodiment is generally structurally similar to the first embodiment, except for an unreacted hydrogen recycling pipeline 44 extended between and connected to the unreacted hydrogen discharge pipeline 4 and the hydrogen supplying pipeline 21.

With the unreacted hydrogen recycling pipeline 44, a part of the unreacted hydrogen discharged from the fuel cell stack 1 is led back to the fuel cell stack 1 via the hydrogen supplying pipeline 21 and recycled. The remaining part of the discharged unreacted hydrogen is still led to the gas mixing device 42 for mixing with the unreacted oxygen before being led to the humidifier 5 and discharged into ambient air.

Figure 3:
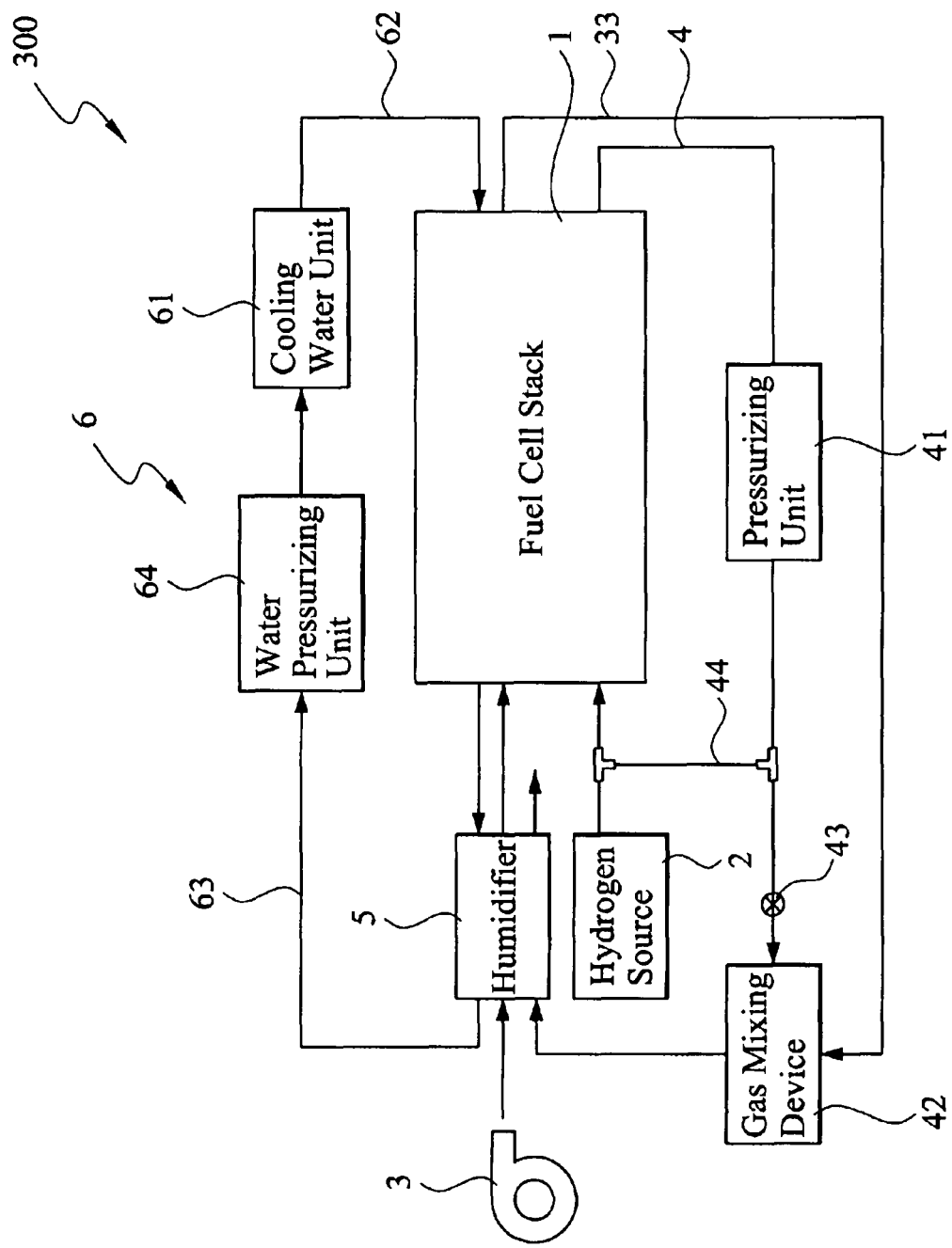
FIG. 3 is a block diagram of a fuel cell system having unreacted gas discharge pipeline associated with humidifier according to a third embodiment of the present invention.

Please refer to FIG. 3 that is a block diagram of a fuel cell system 300 having unreacted gas discharge pipeline associated with humidifier according to a third embodiment of the present invention. As can be seen from FIG. 3, the fuel cell system 300 in the third embodiment is generally structurally similar to the fuel cell system 200 in the second embodiment, except for a water cooling system 6.

The water cooling system 6 includes a cooling water unit 61 and a water pressurizing unit 64. The cooling water unit 61 is connected to the fuel cell stack 1 via a cooling water supplying pipeline 62, so as to supply low temperature cooling water to the fuel cell stack 1 to lower the high temperature produced by the reaction in the fuel cell stack 1 and thereby maintains the fuel cell stack 1 in a normal operating state. The low temperature cooling water having been used to cool and then discharged from the fuel cell stack 1 has a high temperature. The high temperature cooling water is led to the humidifier 5 to serve as a high temperature water source thereof, so as to increase the humidity and temperature of the oxygen supplied from the oxygen source 3 to the humidifier 5, and to regulate the humidity of the unreacted oxygen/hydrogen gas mixture led from the gas mixing device 42 to the humidifier 5. The high temperature cooling water flowing through the humidifier 5 is then led via a cooling water recycling pipeline 63 to the cooling water unit 61 and be cooled thereat. The water pressurizing unit 64 applies pressure to the cooling water in the water cooling system 6, so as to increase the flow rate of the cooling water.

In the above illustrated embodiments, the unreacted oxygen discharge pipeline 33 is simply provided to lead the unreacted oxygen to the gas mixing device 42 for mixing with the unreacted hydrogen and thereby reduces the concentration of the unreacted hydrogen. In practical application of the present invention, the unreacted oxygen may be directly discharged from the fuel cell stack 1 via the oxygen outlet port 14 into the ambient air, while the oxygen for mixing with the unreacted hydrogen in the gas mixing device 42 may be supplied directly from the ambient air by, for example, providing an additional air inlet port on the gas mixing device 42.

The hydrogen source 2 and the oxygen source 3 are simply provided to supply reactant gases for the fuel cell stack 1; wherein the hydrogen source 2 may be a hydrogen storage alloy or a hydrogen tank, and the oxygen source 3 may be an oxygen tank or an air blower. However, the hydrogen and oxygen sources 2, 3 may also be any other known types of gas sources.

The gas mixing device 42 is simply provided for mixing the unreacted hydrogen and oxygen. In practical application of the present invention, the gas mixing device 42 may be a gas mixing chamber, or a three-way union.

The unreacted hydrogen discharge control unit 43 is also provided simply for controlling the flow of the discharged unreacted hydrogen. Therefore, the unreacted hydrogen discharge control unit 43 may be a throttle valve, an electromagnetic valve, or any other known types of controlling units, so long as these valves and units provide equivalent function and effect.

In the illustrated embodiments of the present invention, the oxygen source and the hydrogen source are provided mainly to supply oxygen and hydrogen needed by the fuel cell stack. Any other known types of oxygen and hydrogen sources providing equivalent function and effect may also be employed in the present invention. For example, the oxygen source may be ambient air and a cooperative blower, or a high-pressure oxygen cylinder or tank; and the hydrogen source may be a high-pressure hydrogen cylinder or tank, or a hydrogen storage alloy.

While the present invention has been described with reference to the specific embodiments, the description is illustrative of the invention and is not to be construed as limiting the invention. Therefore, various modifications to the present invention can be made to the preferred embodiments by those skilled in the art without departing from the true spirit and scope of the invention as defined by the appended claims.

What is claimed is:

1. A fuel cell system, comprising:
   a fuel cell stack including:
      a hydrogen inlet port connected to a hydrogen source via a hydrogen supplying pipeline, so that hydrogen is supplied from the hydrogen source to the fuel cell stack via the hydrogen supplying pipeline and the hydrogen inlet port;
      a hydrogen outlet port, via which the unreacted hydrogen is discharged from the fuel cell stack;
      an oxygen inlet port connected to an oxygen source via an oxygen supplying pipeline, so that oxygen is fed from the oxygen source via the oxygen supplying pipeline and the oxygen inlet port into the fuel cell stack;
      an oxygen outlet port, via which unreacted oxygen is discharged from the fuel cell stack, an unreacted oxygen discharge pipeline being connected at a first end to the oxygen outlet port;
   an unreacted hydrogen discharge pipeline connected at a first end to the hydrogen outlet port for leading out the unreacted hydrogen discharged from the fuel cell stack via the hydrogen outlet port;
   a humidifier, coupled between the oxygen inlet port and an oxygen source, the humidifier including:
      an oxygen source inlet port coupled to the oxygen source;
      a humidified oxygen outlet port coupled to the oxygen inlet port;
      an unreacted gas inlet port;
      a humidified unreacted gas outlet port; and
   a gas mixing device connected to a second end of the unreacted hydrogen discharge pipeline, a second end of the unreacted oxygen discharge pipeline, and the unreacted gas inlet port of the humidifier, so that the unreacted hydrogen discharged from the hydrogen outlet port and the unreacted oxygen discharged from the oxygen outlet port are mixed in the gas mixing device to form an unreacted gas mixture thereby reducing the concentration of unreacted hydrogen, and then the unreacted gas mixture is led to the unreacted gas inlet port of the humidifier to further mix the unreacted gas mixture and reduce the concentration of unreacted hydrogen, and the further mixed unreacted gas mixture then being discharged from the unreacted gas outlet port.

2. The fuel cell system as claimed in claim 1, wherein the unreacted oxygen/hydrogen gas mixture is discharged directly into ambient air.

3. The fuel cell system as claimed in claim 1, wherein the unreacted hydrogen discharge pipeline has a pressurizing unit connected thereto for applying pressure to the unreacted hydrogen in the unreacted hydrogen discharge pipeline.

4. The fuel cell system as claimed in claim 1, wherein the hydrogen source is selected from the group consisting of hydrogen storage alloys and a hydrogen tank.

5. The fuel cell system as claimed in claim 1, wherein the oxygen source is selected from the group consisting of an oxygen tank and an air blower.

6. The fuel cell system as claimed in claim 1, wherein the unreacted hydrogen discharge pipeline is connected to the hydrogen supplying pipeline via an unreacted hydrogen recycling pipeline, via which a part of the unreacted hydrogen discharged via the hydrogen outlet port is led to the fuel cell stack and recycled.

7. The fuel cell system as claimed in claim 1, further comprising a water cooling system; the water cooling system including a cooling water unit for supplying low temperature cooling water into the fuel cell stack to cool the same; and cooling water having been used to cool and then discharged from the fuel cell stack having a high temperature; the humidifier further including a water inlet port coupled to the high temperature water discharged from the fuel cell stack for increasing humidity and temperature of the oxygen supplied from the oxygen source to the humidifier.

8. The fuel cell system as claimed in claim 7, wherein the high temperature cooling water led to the humidifier is further led via a cooling water recycling pipeline back to the cooling water unit to be cooled in the cooling water unit.

9. The fuel cell system as claimed in claim 1, wherein the oxygen source inlet port of the humidifier is connected to the oxygen source via an oxygen supply pipe, so that oxygen is supplied from the oxygen source via the oxygen supply pipe and the oxygen source inlet port into the humidifier for humidity regulation.

10. The fuel cell system as claimed in claim 1 or 5, wherein the humidified oxygen outlet port of the humidifier is connected to the oxygen inlet port of the fuel cell stack via the oxygen supplying pipeline, so that oxygen having been humidified in the humidifier is sent out of the humidifier via the humidified oxygen outlet port and led by the oxygen supplying pipeline into the fuel cell stack via the oxygen inlet port.

* * * * *